Figure 1:
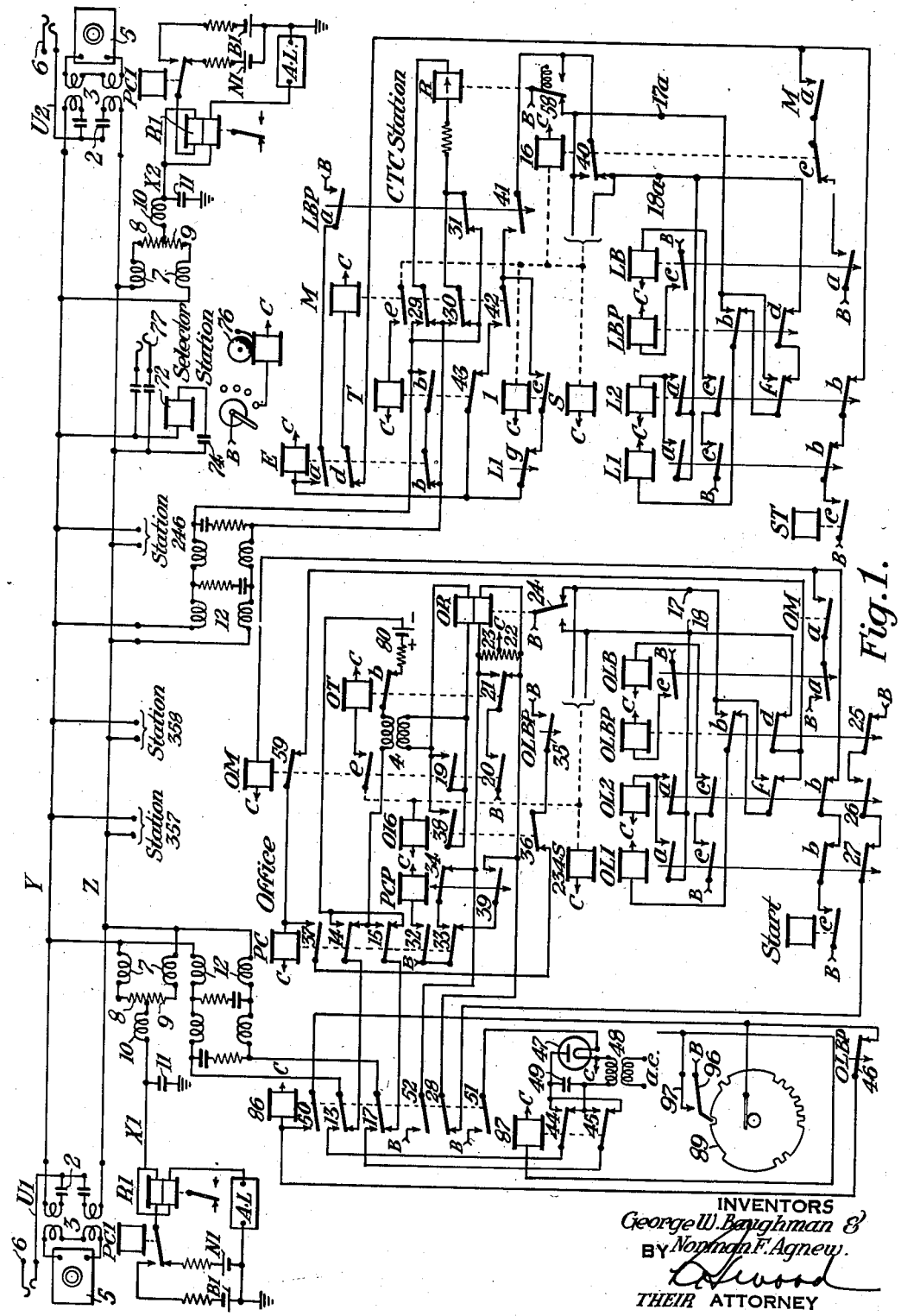

Dec. 1, 1942.  G. W. BAUGHMAN ET AL  2,303,875
REMOTE CONTROL SYSTEM
Filed March 28, 1940  7 Sheets-Sheet 1

INVENTORS
George W. Baughman &
BY Norman F. Agnew.
THEIR ATTORNEY

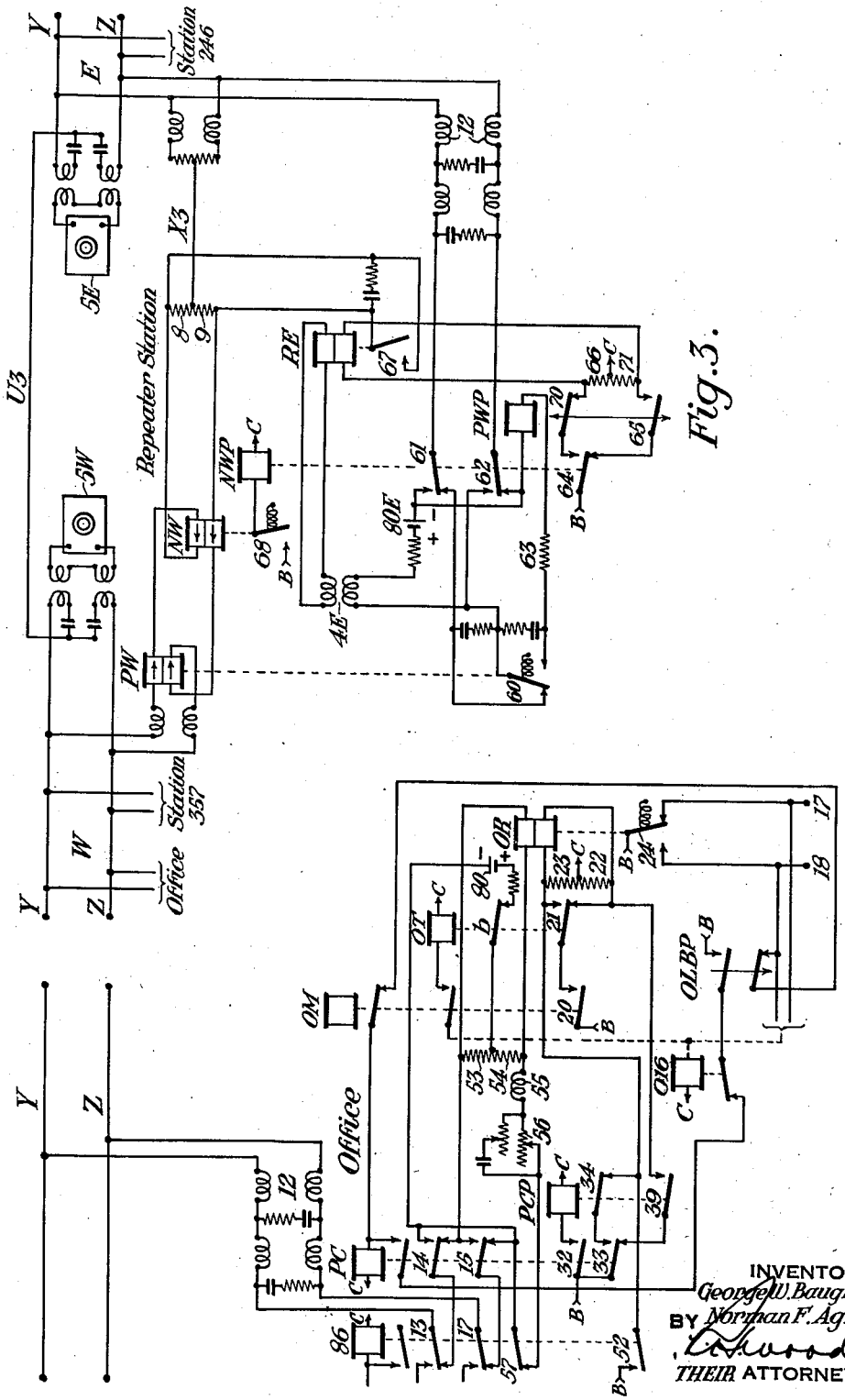

Dec. 1, 1942.   G. W. BAUGHMAN ET AL   2,303,875
REMOTE CONTROL SYSTEM
Filed March 28, 1940   7 Sheets-Sheet 3

INVENTORS
George W. Baughman &
BY Norman F. Agnew.
THEIR ATTORNEY

Dec. 1, 1942.   G. W. BAUGHMAN ET AL   2,303,875
REMOTE CONTROL SYSTEM
Filed March 28, 1940   7 Sheets-Sheet 4

INVENTORS
George W. Baughman &
BY Norman F. Agnew.
THEIR ATTORNEY

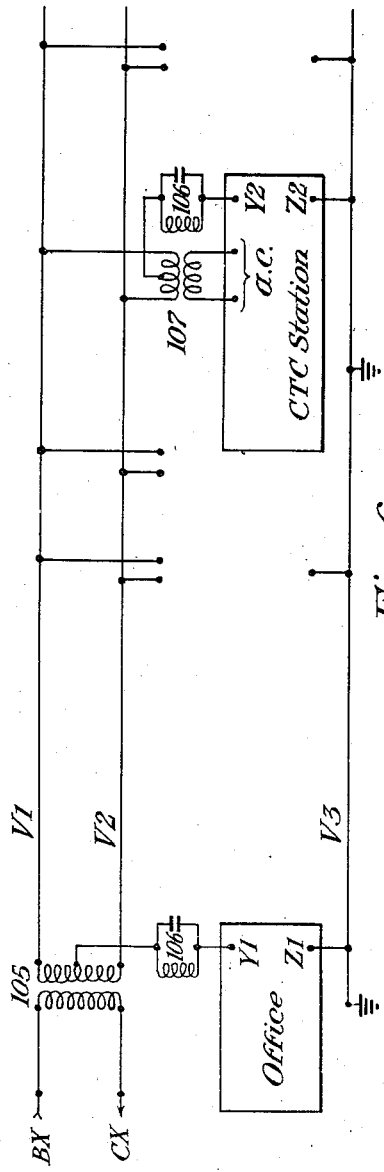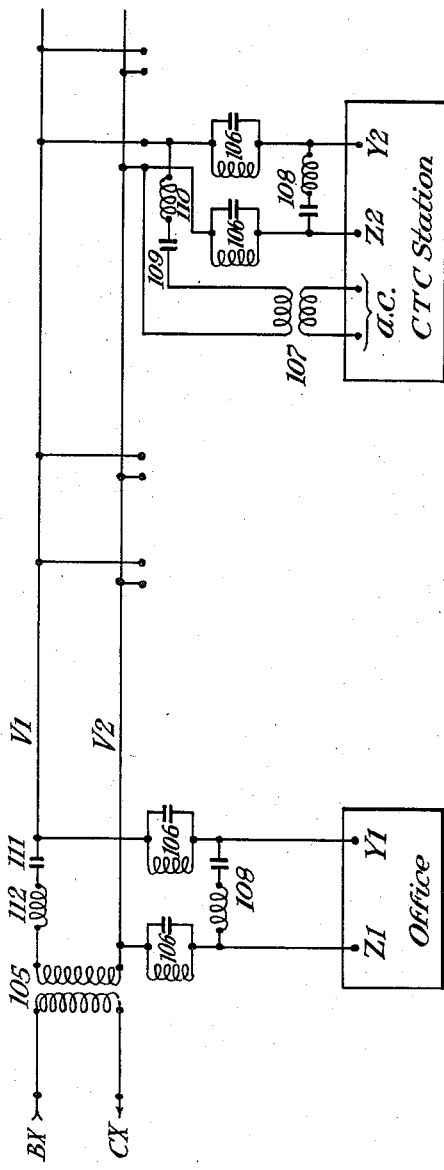

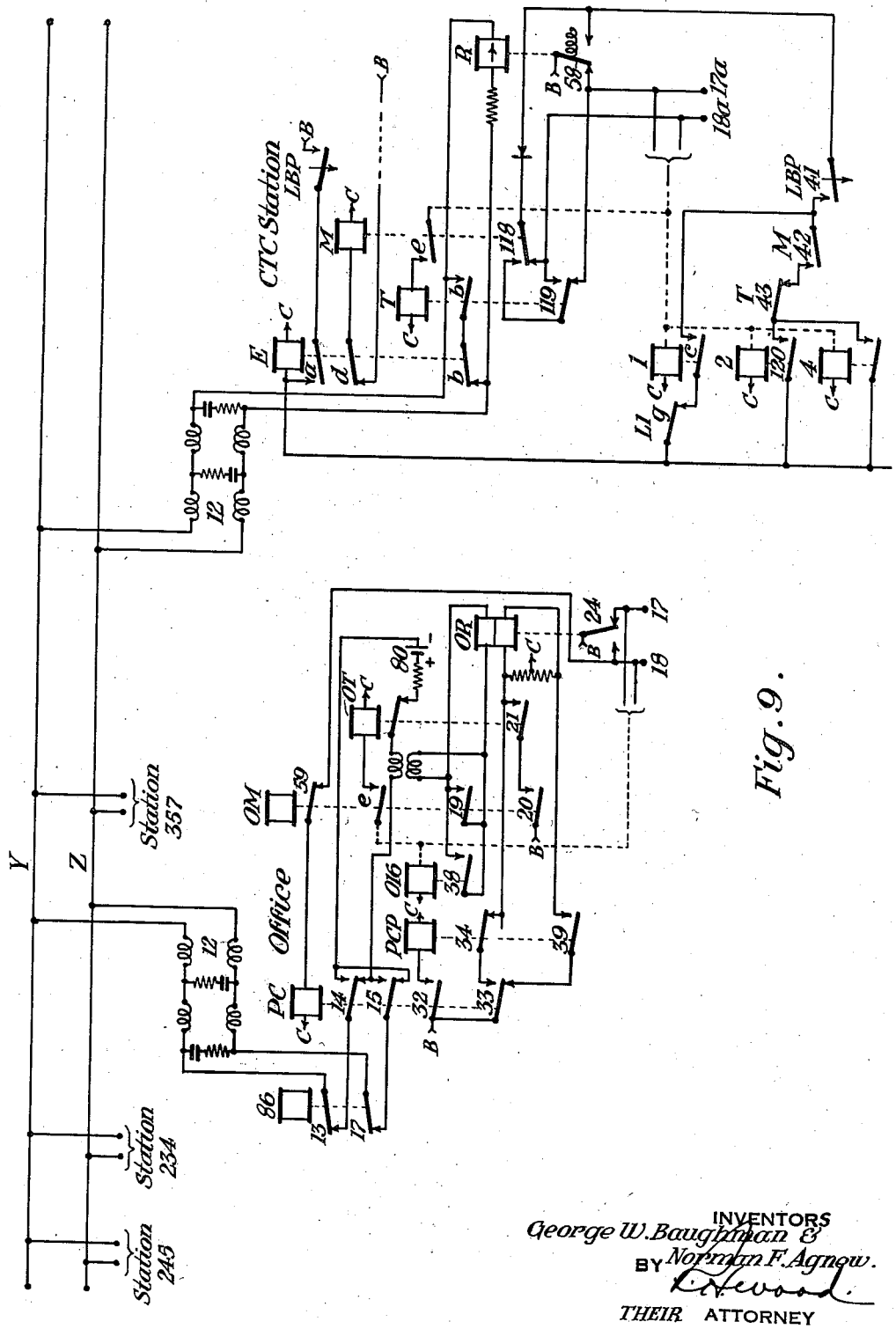

Patented Dec. 1, 1942

2,303,875

UNITED STATES PATENT OFFICE 2,303,875

REMOTE CONTROL SYSTEM

George W. Baughman, Pittsburgh, and Norman F. Agnew, Penn Township, Allegheny County, Pa., assignors to The Union Switch & Signal Company, Swissvale, Pa., a corporation of Pennsylvania Application March 28, 1940, Serial No. 326,440

18 Claims. (Cl. 177—353)

Our invention relates to remote control systems, and more particularly, to the communication or line circuits for centralized traffic control systems for railroads, in which a train dispatcher's office or other suitable point of control is connected with a plurality of field stations by line wires, over which impulse codes of signals are transmitted at times for controlling selected devices at the stations, and at other times for indicating the condition of station devices at the office.

Our invention is an improvement upon the system disclosed in the Letters Patent of the United States No. 2,229,249, granted January 21, 1941, upon an application Serial No. 600,786, filed March 23, 1932, by L. V. Lewis, for Remote control systems; upon that disclosed in Letters Patent of the United States No. 2,259,573, granted October 21, 1941, upon an application Serial No. 261,241, filed March 11, 1939, by L. V. Lewis, for Remote control systems; and upon those disclosed in the Letters Patent of the United States No. 2,248,935, granted July 15, 1941, upon an application Serial No. 314,125, filed January 16, 1940, for Remote control systems, by G. W. Baughman; and in Letters Patent of the United States No. 2,224,374, granted December 10, 1940, upon an application Serial No. 324,369, filed March 16, 1940, for Remote control systems, by G. W. Baughman.

Since a dispatcher's telephone or telegraph line is generally required in connection with systems of this character, it is almost always the case that line wires are available throughout the length of any stretch of territory which is to be controlled by a centralized traffic control system, which are suitable for use for communication by code between the office and stations of that system, but which are already in use for other communication purposes.

One object of our invention is to provide an improved centralized traffic control system of the code type which is adapted to employ existing line wires for the transmission of code signals, without interference with the joint use of these wires for telephone and telegraph communication or for other purposes.

It is often convenient to employ the dispatcher's telephone line for C. T. C. communication. This generally comprises two line wires across which way station telephones and call selectors are bridged, and which, in addition, is "simplexed" to provide a continuous metallic circuit over the two line wires in multiple which may be included in a through duplex telegraph circuit. Furthermore, a "message" line which is similarly arranged generally parallels the dispatcher's line, in which case a long distance or phantom telephone circuit is usually superimposed upon the two telegraph branches, but as is well known, this requires that a reasonably accurate balance be maintained between the two side circuits. On this account it is preferable to maintain the continuity of the line wires intact from end to end and to connect the C. T. C. apparatus to the line wires by means of simple bridged connections. In this respect the system of our invention is an improvement over that shown in Patent No. 2,248,935, above referred to, since in our system there is no C. T. C. apparatus whatever in series with the line wires, an arrangement which is also of advantage in testing the line circuits and in arranging for the independent maintenance of the different services as usually provided. Heretofore bridged line circuit systems have required sources of line current at each field station, as illustrated, for example, in the hereinbefore referred to Patent No. 2,259,573, and consequently the series C. T. C. circuit as illustrated, for example, in Patent No. 2,229,249 above mentioned, has generally been preferred, because it can be energized more conveniently and economically, requiring a line battery at the central office only. Our invention embodies both these features, and a further object may therefore be stated broadly, as the provision of a remote control system of the central battery type, in which communication is effected in two directions between the office and stations over line wires which are maintained continuous from end to end.

A specific object of our invention, as illustrated in one form, comprises the provision of a central battery remote control system employing a normally energized line circuit, which in the event of a break in the line remains operative with respect to the field stations on the office side of the break.

A feature of our invention is the provision of a line relay for a system of this character which is responsive only to the rate of change of the line current and not to the absolute value of the current, so that the operation of the relay is not permanently affected by a fixed change in the value of the line current. Another feature is the provision of a polarized line relay which is arranged to be connected to the line through a transformer, and consequently is normally deenergized, with means controlled locally by the relay for insuring that it will assume its proper normal position when no signals are being transmitted over the line.

Another object of our invention resides in the provision of apparatus for signaling to a central office from a plurality of spaced points located along a line circuit by merely connecting the line wires together, preferably through an impedance suitably arranged so as to permit the joint use of the line wires for other purposes without interference. Our invention also includes in a system of this character provision for signaling from the transmitting point not only in one direction to the control office but also in the opposite direction to lock out the apparatus at any point more remote from the office which is attempting to gain control of the line at the time.

A further object of our invention resides in the provision of a central battery remote control system employing a single pair of line wires which are maintained continuous from end to end, in which the control office may be located at an intermediate point with the stations located in either or both directions from the office.

Other objects, purposes and features of our invention will be pointed out as the description proceeds.

Three forms of our invention and several modifications of one form will now be described, and the novel features thereof will then be pointed out in claims.

Figure 4:
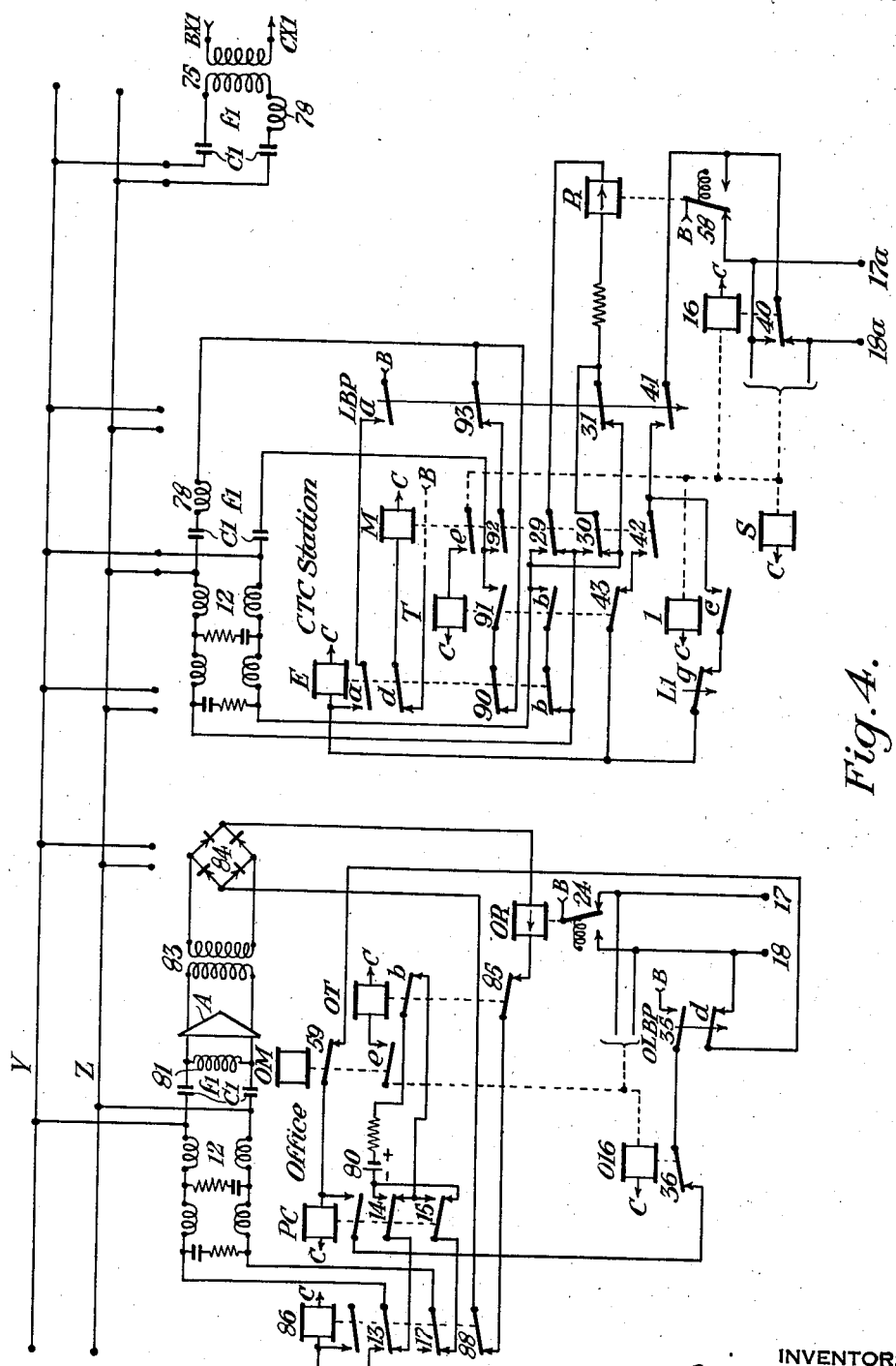
Figure 5:
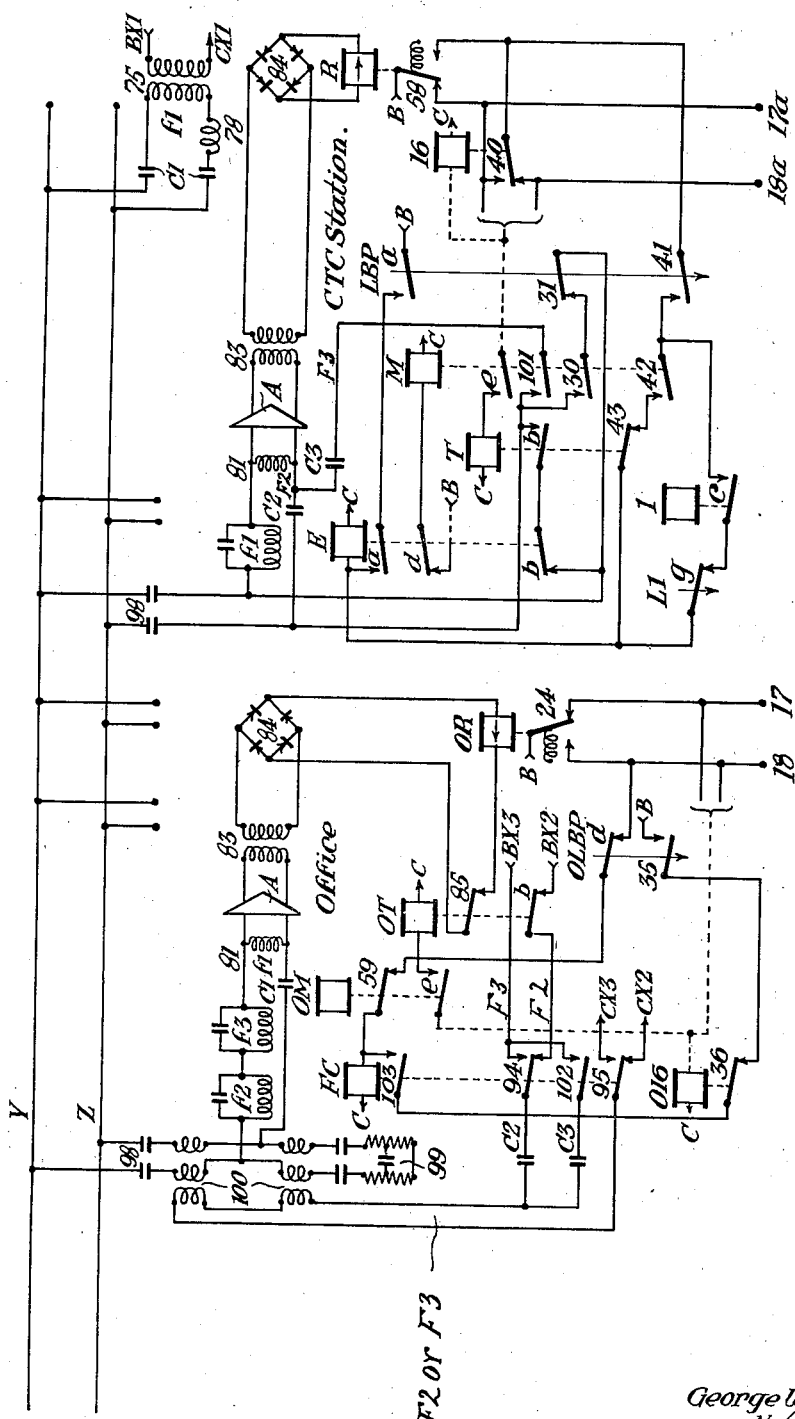
Figure 8:
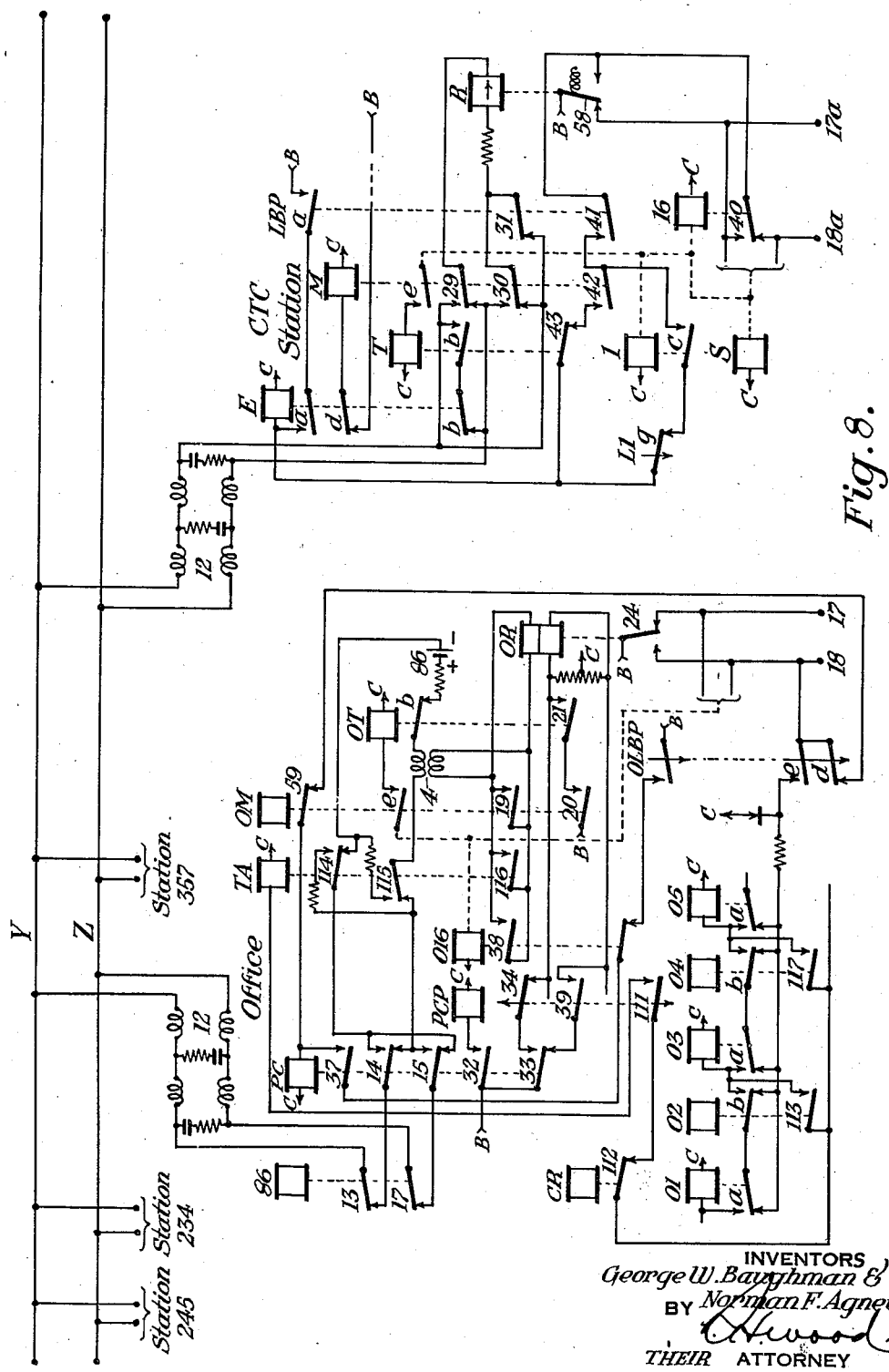

Referring to the accompanying drawings, Fig. 1 illustrates in diagrammatic form one form of centralized traffic control apparatus embodying our invention employing a source of direct current at the office for two-way code communication between a control office and a plurality of stations connected by line wires which are continuous from end to end. Fig. 2 comprises a modification of the office equipment of Fig. 1, showing a different form of line relay. Fig. 3 shows a two-way repeater suitable for use in the line circuit of Fig. 1. Fig. 4 illustrates the second form of our invention, in which alternating current is used for code transmission in one direction. Fig. 5 shows a third form, employing alternating currents for transmission in both directions. Figs. 6 and 7 show other forms of line circuits which are suitable for use with the apparatus of Figs. 1 and 2. Figs. 8 and 9 show modifications of the apparatus of Fig. 1 in which the control office may be located at an intermediate point in the line.

Similar reference characters refer to similar parts in each of the several views.

Referring to Fig. 1, the reference characters Y and Z designate the two line wires which provide a circuit for code communication between the office and stations of our centralized traffic control system, and it has been assumed that the line wires are arranged to provide other communication facilities in a manner which is more or less typical of actual conditions in this field, but with which we are not concerned further than to point out the variety of facilities that may be provided and to make clear that these facilities and our C. T. C. system are mutually non-interfering.

For a better understanding of our invention, however, these facilities will first be briefly explained. Primarily, the line wires Y and Z provide a telephone circuit arranged for train dispatching purposes, and are connected at one end through condensers 2 and the telephone transformer 3 to telephone apparatus 5 located at the dispatcher's office, and at the other end through a similar connection to similar telephone apparatus 5 located at another main office. The dispatcher's office is also provided with a telephone call selector system which is assumed to be of the type shown in the Field Patent No. 1,343,256, granted June 15, 1920, comprising a plurality of code wheels 89 by which the dispatcher may transmit impulse codes to selectively call various way stations to establish telephone communication therewith. Since these stations are all alike, but one is shown, as indicated by the legend "Selector station" on the drawings, and each comprises a selector 72 bridged across the line wires Y and Z through a condenser 74, for selectively operating a call bell 76. The station operator, when called, establishes a connection with the dispatcher's office by connecting his telephone across the line by means of jack 77. In order to facilitate an understanding of this apparatus, the reference characters designating the elements of the selector system shown herein are the same as those of the Field patent.

The dispatcher's line is "simplexed" in the usual manner by the provision of a choke coil 7 and resistors 8 and 9 bridged across the line wires Y and Z at each end, to the mid point of which a line wire X1 or X2 is connected to provide a duplex telegraph circuit extending from ground at each end through standard terminal apparatus comprising the line batteries B1 and N1, the contacts of pole changer PC1 and thence differentially through the windings of the line relay R1 to line wire X1 or X2 or through an artificial line AL to ground.

The dispatcher's line is also "phantomed" in a well-known manner, the two line wires Y and Z in multiple constituting one side of a telephone circuit extending from a telephone jack 6 at each end over wire U1 or U2 to a connection to the line wires Y and Z effected at the mid point of condensers 2. It is to be understood that the other side of the phantom circuit, not shown, is similarly arranged and comprises another pair of line wires, similar to Y and Z. It will be seen that each side of the phantom circuit, one of which comprises the line wires Y and Z in multiple, is employed jointly for telephone and telegraph purposes in accordance with a well-known composite arrangement, by reason of the condensers 2 in series with wires U1 and U2, and of the choke coils 10 in series with wires X1 and X2, and condensers 11 connected between these wires and ground.

The central office equipment of the C. T. C. system of our invention is assumed to be located at the dispatcher's office, this being identified by the legend "Office" in Fig. 1, and the C. T. C. field stations are assumed to be located at various points along the line indicated by branch connections to line wires Y and Z. Since all the C. T. C. stations are similarly arranged, for simplicity but one is shown, this being indicated by the legend "C. T. C. station" on the drawings.

The C. T. C. apparatus which is employed in the system of our invention for generating and receiving the codes may be of any suitable type, but in the specific embodiment of our invention disclosed herein this is to be understood to be of the well-known "time code" type as disclosed in the Lewis Patent No. 2,229,249 hereinbefore referred to, but modified in certain respects in accordance with the requirements of our invention as will hereinafter be pointed out. In the drawings of this patent, the relay contacts are identified by lower case letters, and to facilitate an understanding of our invention, we have designated those relay contacts shown in the accompanying drawings which correspond to contacts of correspondingly designated relays in the system of Patent No. 2,229,249 by the same reference characters as are employed in the patent, while other contacts are identified by number. It is to be understood that all of the C. T. C. apparatus the operation of which is not specifically described herein functions in the manner described in the patent. The circuits by which the slow acting relays L are controlled by the line relays as shown herein and likewise the circuits for the master relays OM and M are similar to the corresponding circuits of the patent and are reproduced herein merely for convenience.

Our invention relates particularly to the provision of improved line circuits and those disclosed herein differ very materially from that of Patent No. 2,229,249, where the office line relay OR and the station line relays R are all normally energized in series over line wires Y and Z by a central office battery 30. As disclosed herein in Fig. 1, the office battery 80 is employed as the source of the code impulses for both the C. T. C. system and for the selector system, and these are arranged so that but one system can obtain control of the line at a time in a manner somewhat similar to that disclosed in the Baughman Patent No. 2,248,935 hereinbefore referred to. In Fig. 1 the office line relay OR is normally deenergized, but the line wires Y and Z are normally energized by current from battery 80 over a connection which may be traced in Fig. 1 from line Y, the upper coils of a low pass filter network 12 similar to that of the Field patent, back contact 13 of the connecting relay 88 of the selector system, back contact 14 of relay PC, the primary of transformer 4, back contact b of the C. T. C. transmitter relay OT, battery 80, back contacts 15 and 17 of relays PC and 88, the lower coils of the filter 12 to wire Z. Relay PC and its repeater relay PCP are additional relays, not shown in the Lewis Patent No. 2,229,249, the purpose of which will be explained hereinafter.

The field station line relays R as employed herein are of the high resistance biased polar type connected across the line wires Y and Z through a low pass filter 12 as in the bridged line circuit system of the Lewis Patent No. 2,259,573, hereinbefore referred to, but as shown herein each is normally energized by current from the office battery 80 to maintain its left-hand or front contact 58 closed, as shown. Each relay R as employed herein therefore functions to control the station coding unit precisely like the normally energized relay R of Patent No. 2,229,249, in response to the control codes delivered to the line circuit as the result of the periodic opening of contact b of the office transmitter relay OT as described in that patent. For convenience, the normal direction of current in the winding of the polar line relay R, and in the windings of similar relays shown in other views, is indicated by an arrow.

The office line relay OR of Fig. 1 is different from the station line relays, being of the stick polar type, arranged to hold its contacts closed in their last operated position when the relay is deenergized. Relay OR has two windings one of which is associated with the line by being connected to the secondary of transformer 4, as shown, while its other winding is controlled locally. During the transmission of control codes by relay OT, the office master relay OM is energized and its front contact 19 shunts the secondary of transformer 4 so the line winding of relay OR does not function. Relay OR is then controlled locally, in accordance with the control code delivered to the line wires by relay OT, by circuits including its lower winding and contact 21 of relay OT. Thus each time relay OT picks up to open the line circuit at its contact b, relay OR is energized by a local circuit extending from one terminal B of the local source of current over front contacts 20 and 21 of relays OM and OT, the lower winding of relay OR, resistor 22 to the other terminal C of the local source, and it is to be understood that current passing from left to right through relay OR operates its contact 24 to the left to connect terminal B to wire 18, which corresponds with the wire leading to the back contact of the normally energized office line relay OR of Patent No. 2,229,249. Likewise, each time relay OT releases to close the line circuit, a local circuit is closed from terminal B at contact 20 of relay OM over back contact 21 through relay OR from right to left and thence through resistor 23 to terminal C, to restore relay OR to its normal position as shown, thereby to connect terminal B over its right-hand contact 24 to wire 17, which corresponds with the wire leading to the front contact of relay OR of the patent. It will be clear that during the transmission of control codes, relay OR as disclosed herein functions to control the office coding unit in the same manner, and consequently these codes will be transmitted precisely as described in the patent. The wires 17a and 18a leading to contact 58 of each station line relay R correspond to the control wires of the coding units which lead to the front and back contacts, respectively, of the station line relays R of the patent, and consequently the stations will receive the codes as described in the patent. No further description of the transmission or reception of control codes from the office to the stations is deemed necessary, other than to point out one difference in the mode of operation. With relay OR in series in the line as in the system of the patent, transmission of a control code is stopped in the event of a line break occurring during transmission as explained in the patent, but when relay OR is controlled locally as just described, the system remains operative from the office out to the location of the break, for the reason that the operation of relay OT is not dependent upon the condition of the line circuit, and for the further reason that the line relays R are connected to the line in multiple rather than in series.

With the system in its normal at rest condition, relay OR is connected to the line circuit through transformer 4, and is thereby rendered responsive to the rate of change of the line current irrespective of its actual magnitude. It is to be understood that if the normal line current is increased by a suitable amount, an impulse will be delivered by transformer 4 to relay OR of such relative polarity as to close its left-hand or back contact 24, while if the line current is correspondingly decreased an impulse of the opposite polarity will be delivered to restore relay OR to normal to close its right-hand or front contact. It follows that if a line break occurs when the coding equipment is in its normal at rest condition, the impulse delivered to relay OR as a result of the decrease in the line current will tend to move contact 24 to the right-hand position which it already occupies, and hence will be without effect upon the subsequent transmission of control codes out to the location of the break.

As will be explained hereinafter in more detail, the operation of the station transmitter relay T to transmit an indication code connects line wires Y and Z together periodically at contact b of relay T over a relatively low impedance path including only the coils of the filter 12 and the closed back contact b of relay E, thereby shunting and consequently reversing the station line relay R the same as if the line were opened, but increasing the current delivered by battery 80 so as to reverse the office line relay OR. It will be understood that the voltage delivered to relay OR will be in proportion to the rate of change of the line current rather than to its absolute value, and that by properly proportioning transformer 4, very prompt and efficient operation of relay OR in response to relatively small changes in the line current is thereby attained, the arrangement having the further advantage that relay OR is wholly immune to slow changes in the line current as caused, for example, by variations in line leakage.

Heretofore it has not been practicable to employ a two-position polarized line relay in this manner in a circuit including a transformer, for the reason that since the relay is normally deenergized it may be accidentally reversed, as for example, by an impulse of foreign current, or if a momentary cross should occur between line wires Y and Z. This difficulty is overcome in accordance with our invention by the provision of a local restoring circuit for relay OR, which functions in such a manner as always to restore the relay to normal if it becomes reversed and remains in that condition for a time interval materially longer than required in the normal operation of the system.

Assuming that relay OR becomes reversed by a single impulse in this manner, terminal B will be connected over the left-hand contact 24 of relay OR to wire 18 to effect the successive energization of the timing relays OL1, OL2, OLB and OLBP. The operation of contacts f and b of relays OL2 and OLBP deenergizes relay OL1 by disconnecting it from wire 18, so that after their prescribed time intervals relays OL1, OLB and OLBP then release successively, relay OL2 being held energized over a stick circuit including its front contact a, all of which is precisely as occurs in the system of Patent No. 2,229,249 in the event the normally closed series line circuit of that patent is opened for an interval longer than any occurring in normal code operation. As shown in Fig. 1, when relay OLBP releases, its back contact 25 completes the restoring circuit for relay OR from terminal B over front contact 26 of relay OL2, back contacts 27 and 28 of relays OL1 and 86 through the lower winding of relay OR, resistor 23 to terminal C, thereby restoring relay OR to normal, as shown. Then relay OL1 becomes energized over wire 17, reenergizing relays OLB and OLBP, after which relays OL2, OLB, OLBP and OL1 release in order to restore the apparatus to the condition shown in the drawing, precisely as occurs when the normally closed line circuit of the patent is reestablished. It will be seen therefore that although relay OR is normally not self-restoring but is arranged to remain in either position to which it is operated, an accidental operation of that relay which leaves it in an abnormal position merely suspends the operation of the system for but a relatively short period which in practice is in no way detrimental.

The starting circuit at the office by which relay OM is energized to initiate control codes is arranged as heretofore, to include a front contact c of a start relay identified by the legend "Start" on the drawings, and back contacts b of relays OL1 and OL2. Since the two last named relays are both released only when relay OR remains steadily in its normal position, its will be apparent that control codes can be initiated as heretofore only when the system is in its normal at rest condition.

The transmission of an indication code by a C. T. C. field station will now be explained. It is to be understood that a change in condition of a station device having indications to transmit picks up a start relay ST, which in turn, provided the station line relay R is steadily energized, picks up the master relay M to prepare circuits for governing transmitter relay T, and that relay T picks up in response to the closing of contact e of relay M, in the usual manner. As shown herein, relay T when picked up shunts line wires Y and Z by closing its contact b as already explained. Relay M by the operation of its pole changer contacts 29 and 30 reverses the connections of relay R and at the same time completes a shunt extending from line wire Z over front contact 30 of relay M and back contact 31 of relay LBP to wire Y. It will be seen therefore that at the beginning of the code, the shunt is applied by relay M slightly before relay T picks up, and then relay R is released, and that the current in the portion of the line circuit extending to stations more remote from the office is reduced to release the line relays at these stations, while at the same time the current in the line portion extending to the office is increased to reverse relay OR, as a result of connecting the line wires together at the transmitting station by relay M.

Furthermore, when the line is shunted the current flow from battery 80 will be limited principally by the impedance of the intervening line wires, and the voltage as measured across line wires Y and Z will decrease in proportion to the distance from the office. It may be that this voltage will be only slightly less than that of battery 80 at points near the office, if the shunt is applied at a far distant point. Consequently the shunt cannot be relied upon for the release of the relays R at stations between the office and the transmitting station, when long distances are involved. Our invention includes provisions for releasing these relays positively, this being effected by a reversal of the line polarity, as will now be explained. When the office line relay OR becomes reversed, it disconnects terminal B from wire 17 and connects it to wire 18, so that the timing relays OL pick up sequentially, as already described. Relay OR also completes a circuit from terminal B over wire 18, back contact d of relay LBP and back contact 59 of relay OM through relay PC to terminal C. Relay PC therefore picks up and at its contact 32 energizes a slow pick-up slow release repeater relay PCP, while its contacts 14 and 15 reverse the polarity of the current delivered to the line wires Y and Z. The purpose of relay PCP is to energize the local winding of relay OR momentarily so that any change in the current in the primary of transformer 4 due to the operation of contacts 14 and 15 will be devoid of effect upon relay OR. Thus when relay PC picks up, a circuit is closed momentarily from terminal B, front contact 33 of relay PC, back contact 34 of relay PCP, through the lower winding of relay OR, resistor 22 to terminal C to hold relay OR reversed, this circuit being opened at contact 34 as soon as relay PCP picks up. When relay OLBP picks up, a stick circuit for relay PC is completed from terminal B, contact 35 of relay OLBP, back contact 36 of relay O16, front contact 37 and winding of relay PC to terminal C. Relay PC remains energized until its stick circuit is opened, either by the energization of relay O16 at the end of a completed code, or in other cases, such for example as when relay OR is accidentally reversed as already described, by the release of relay OLBP.

The reversal of the line polarity by relay PC, which occurs at about the same time as the station relay T picks up, releases the line relays R at the remaining stations, or more particularly, at each station relatively so close to the office in comparison to the location of the transmitting station that the shunt across line wires Y and Z is not sufficient to effect the release of the corresponding line relay. At all stations, therefore, the line relays R will release at nearly the same time, due either to the shunt initially applied by relay M at the transmitting station or to the resulting reversal in the polarity of the line current, and each will disconnect terminal B from wire 17a and connect it to wire 18a to effect the sequential energization of the associated timing relays L. It will be seen that each relay R supplied with current of reverse polarity, that is, the relay R at each station that does not have its relay M picked up, will remain deenergized for the duration of the code so that its starting circuit will be held open at contact b of relay L2. One branch of the shunt across the line wires Y and Z due to relay M is opened at contact 31 as soon as relay LBP picks up and is held open by relay LBP for the duration of the code, and the latter relay, as explained in Patent No. 2,229,249, then causes relay T to release to complete the first step of the code by opening the other branch of the shunt at its contact b, whereupon relay R at the transmitting station picks up. Relay T then continues to operate its contact b repeatedly in the usual manner to transmit the code, relay R at the transmitting station picking up each time relay T releases, and releasing each time relay T picks up, to govern the operation of relay T and of the station coding unit precisely as heretofore. At the office, each decrease in the line current due to the release of the station relay T causes transformer 4 to deliver an impulse to relay OR in such a direction as to close the right-hand or front contact 24, and each increase in the line current due to the pick up of relay T causes contact 24 to move to the left, so that relay OR operates in unison with relay R and controls the office coding unit in the usual manner to receive the code.

As explained in Patent No. 2,229,249, each indication code has sixteen steps, the last step comprising the return of the line circuit to its normal condition, a relay 16 at the transmitting station and a similar relay O16 at the office being picked up momentarily on this step. It will be evident that whereas in the system of the patent all line relays assume their normal position at the beginning of this step, in the present case that is true of the office line relay OR and relay R at the transmitting station only, the remaining line relays having been held reversed due to the reverse polarity of the line current.

At the office, relay O16 opens its contact 36 at the beginning of the final step, thereby opening the stick circuit for relay PC, which therefore releases to restore the line polarity to normal. At this time relay OR is shunted by contact 38 of relay O16, and so remains in its normal position. The circuit for relay PCP is opened at contact 32 of relay PC but before relay PCP releases a local current impulse is delivered to relay OR from terminal B, back contact 33 of relay PC, front contact 39 of relay PCP, relay OR, resistor 23 to terminal C to further insure that relay OR remains in its normal position.

At the transmitting station, relay 16 at its contact 40 disconnects wire 18a from the right-hand contact 58 of relay R and connects wire 17a to that contact, and at its contact c opens the stick circuit for relay M which relay releases to restore the connections of relay R to normal at contacts 29 and 30 and to complete the restoration of the station coding apparatus to normal. It will be seen that relay R at the transmitting station will be reversed momentarily on the last step unless relays PC and M happen to release at precisely the same time, but that this is without effect because the temporary connection over front contact 40 of relay 16 maintains the coding unit in the same condition as if relay R remained steadily in its normal position.

The restoration of the line polarity to normal by relay PC causes the line relays R at the remaining stations to assume their normal positions, the resulting operations of restoring all the apparatus to normal then being effected in a well-known manner as explained fully in the patent.

It will be apparent that the mode of initiation of an indication code as above described is positive in its action to prevent interference in the event the office and a station initiate codes at the same time. More particularly, when relay T releases to begin the second step of an indication code, the associated relay R is held released on the first step unless current of reverse polarity is received from the office. If the office initiates a control code at this time, the line will be held open by relay OT for a relatively long interval to complete the usual pick-up circuit for the relay E, which as shown includes back contact g of relay L1, front contact c of the counting relay 1, contact 41 of relay LBP and the reverse contact 58 of the line relay R. Relay E upon picking up opens its back contact b in the shunt including contact b of relay T, and also opens the circuit for relay M at its contact d to release that relay to stop further transmission from the station. Relay M upon releasing conditions the station coding unit to receive the control code, by rendering relay R again responsive to line current of normal polarity.

It may happen, however, that two or more stations initiate indication codes at the same time. In this instance they may continue in operation as long as the code elements are alike, but when a difference occurs one or another is locked out by means of an additional pick-up circuit provided for the station relay E.

It is to be understood in this connection that as described in Patent No. 2,229,249, the code selection of the several stations and of the corresponding office panels is effected by the combination of three long and four short steps in a group comprising steps 2 to 8, inclusive, of each code, The code calls are identified by the long steps which they contain, for example, when the second, third and fourth steps of a code are long and steps five to eight are short, the station employing the code is designated 234 and a selector relay 234S at the office and a corresponding relay S at station 234 will be picked up.

It will be evident from Fig. 1 that when relay T picks up to begin an odd-numbered step of the code, the associated relay R will release, and that if relay T remains picked up to produce a long step, the shunt produced by relay T at the transmitting station will remain effective at any station more remote from the office for a corresponding length of time. At any such station having a code call in which the corresponding step is short, relays R and T will both be deenergized for a time equal to the difference between a short and a long step, during which time a lockout circuit will be closed from terminal B, right-hand contact 58 of relay R, front contacts 41 and 42 of relays LBP and M, back contact 43 of relay T, relay E to terminal C, so that relay E will pick up to establish a stick circuit at its contact a and to open its contacts b and d to release relay M and to prevent the transmission of any additional code elements from that station.

On the other hand, whenever relay T releases to begin an even-numbered step of a code, it is necessary that relay R become energized immediately to open the lockout circuit for relay E just traced before relay E picks up, as ordinarily occurs because relay R is relatively quick acting in comparison with relay E. If, however, relay T remain released to produce a long even-numbered step, a shunt applied by another station nearer the office having a call in which the corresponding even step is short will release relay R at the more remote station to pick up relay E over its lockout circuit. It will be seen therefore that a long odd-numbered step takes precedence over a short one, but that a short even-numgered step takes precedence over a long one. To insure that the shunts produced by relays T are fully effective, it is desirable to assign the code calls to the several stations in a geographical order, that is, so that the call for each station is superior to those for all more remote stations and inferior to those for all stations nearer the office. The most superior code call is 357, consequently, as indicated in Fig. 1, this is assigned to the station nearest the office; the next in the order of code superiority is the code call 358 which is assigned to the second station; next come 356, 378, 367, 368 and 345, in that order, and if all the codes are used, the most remote station will have the most inferior code call 245.

It will be apparent from the foregoing that when indication codes are initiated by two or more stations at the same time, the station nearest the office retains sole control of the line, and that several codes initiated simultaneously will be transmitted one at a time in a predetermined order, as heretofore.

The relation of the dispatcher's telephone call selector apparatus to the C. T. C. system will now be explained. This apparatus, as explained in the Field patent, comprises a plurality of code wheels 89, one for each selector, of which but one is shown herein, each of which when wound up and released makes one revolution during which a connecting relay 86 is energized to connect a source of direct current to the line over the contacts 44 and 45 of a pole-changer relay 87. As the code wheel rotates, relay 87 is intermittently energized over a circuit including the code wheel contacts 96 and 97 in accordance with the arrangement of the code wheel teeth to deliver a code of impulses of alternately opposite polarity to the line wires Y and Z to operate the selectors 72.

As disclosed herein, the selector apparatus is arranged so that the operation of a code wheel is ineffective unless it is released when the C. T. C. apparatus is in its normal at rest condition as manifested by the deenergized condition of relay OLBP at the office. When relay OLBP is in its released position, the release of a code wheel completes a circuit from terminal B at the code wheel contact 96 over code wheel 89, back contact 46 of relay OLBP, relay 86 to terminal C. Relay 86 picks up to disconnect the C. T. C. line battery 80 from line wires Y and Z and to connect the line wires over its front contacts 13 and 17 to the pole changer contacts 44 and 45 of relay 87.

Since the selectors require a considerably higher voltage for their operation than the usual C. T. C. line relay, it is customary to provide a separate source of line current, which in practice usually comprises rectified alternating current obtained by means of a vacuum tube rectifier 47 and transformer 48 having its primary connected to the local alternating current lighting circuit as indicated by the legend "a. c." in Fig. 1, with a tank condenser 49 connected across the transformer secondary in series with the tube, as shown.

When relay 86 picks up it completes a stick circuit at its contact 50 which remains closed until the code wheel returns to normal, and at contact 51 completes a circuit for energizing the filament of the rectifier tube 47. Tube 47 is to be understood to be of a type requiring its filament circuit to be closed for at least one-half second before sufficient electron emission is developed to deliver appreciable current to the line. Since relay 86 disconnects battery 80 from the line at the beginning of this period, each selector code begins with a long "line-open" period, similar to that of the first step of a C. T. C. control code, and which is likewise effective to lock out any field station that happens to initiate a code at that time. Relay 86 when energized opens at contact 28 the restoring circuit for relay OR hereinbefore referred to, and at its contact 52 completes a circuit from terminal B through the lower winding of relay OR, resistor 22 to terminal C, thereby holding relay OR reversed for the duration of the selector code, with the result that relay OL2 is energized to hold the pick-up circuit for relay OM open to prevent the initiation of a C. T. C. control code until the selector code is completed. When relay 86 releases at the end of the selector code, contact 28 completes the circuit for restoring relay OR to normal to thereby restore the C. T. C. apparatus to its normal condition.

The selector codes and C. T. C. codes are mutually non-interfering in respect to the operation of the code receiving apparatus because of the difference in the relative proportion of long and short code elements as explained more fully in the Lewis Patent No. 2,259,573 hereinbefore referred to, and since the transmitters do not interfere one with another, for the reasons that have just been pointed out, it will be clear that both systems may employ the same line channel without interfering with each other or with the joint use of the line wires as hereinbefore described.

Referring now to Fig. 2, in this view a modified form of the office apparatus is shown employing a line relay OR which is of the biased polar type like the station line relays R, the apparatus of this view being an improvement upon the somewhat similar arrangement shown in the Baughman Patent No. 2,248,935 hereinbefore referred to. Except for the differences which will now be pointed out, this apparatus is similar to the corresponding portion of Fig. 1 and can be used interchangeably therewith in the system of Fig. 1.

In Fig. 2, the line wires are normally energized by current from battery 80 over a connection which may be traced from line Y, the upper coils of the filter 12, back contacts 13 and 14 of relays 86 and PC, resistor 53, back contact b of relay OT, battery 80, back contacts 15 and 17 of relays PC and 86, through the lower coils of filter 12 to wire Z. Current is also supplied from the lower terminal of battery 80 through a circuit including resistor 54, coil 55, artificial line 56 and back contact 57 of relay 86 to the upper terminal of battery 80. The artificial line 56 is balanced to match the line circuit including wires Y and Z so that the current through the line winding of relay OR, which is bridged across resistors 53 and 54, is substantially zero, and armature 24 is held normally by the relay bias in the right-hand position as shown.

During the transmission of control codes by relay OT, the operation of its line contact b has a negligible effect upon the line winding of relay OR, which relay is then controlled by current through its lower winding supplied over contacts 20 and 21 of relays OM and OT precisely as in Fig. 1. When a field station shunts the line wires Y and Z to initiate an indication code as already explained in connection with Fig. 1, additional current flows from the lower terminal of battery 80 through resistor 54 and from left to right through the line winding of relay OR to line Y to operate armature 24 to the left, energizing wire 16 to energize relay PC and the timing relays OL, the latter relays and related circuits being omitted from Fig. 2 since in this form of the apparatus they are similar to those of Fig. 1. Relay PC functions as already explained, to reverse the line polarity, which is without effect upon relay OR because this relay is held reversed locally by relays PC and PCP as in Fig. 1.

When relay 86 becomes energized in Fig. 2 to effect the transmission of a selector code, the line wires Y and Z are disconnected from battery 80 at back contacts 13 and 17 and the artificial line is opened at back contact 57 of relay 86, but as long as relay 86 is energized relay OR is held reversed by current supplied to its local winding over contact 52 of relay 86. It will be evident, therefore, that the operation of the system when the office apparatus is arranged as in Fig. 2 is in all respects similar to that already described in connection with Fig. 1.

Fig. 3 illustrates one form of two-way repeater that may be used with the systems of Fig. 1 or 2 to extend the transmission distance or when for any reason the line wires Y and Z are not continuous throughout the length of the C. T. C. territory. It will be assumed that the apparatus of Fig. 3 is interposed in the line circuit of Fig. 1 at a point where intermediate telephone apparatus, designated 5W and 5E is located, and that the control office and some of the C. T. C. stations are located at the left on the section W of the line, while the remaining stations are located at the right on another section E of the line. The telephone and the telegraph circuits are passed around the repeater in an obvious manner over wires U3 and X3, as shown. Connected across the line wires Y and Z of line W in series with the bridge resistors 8 and 9 of the telegraph circuit are provided two double wound line relays PW and NW of the biased polar type, both of which are normally supplied with current supplied to the line wires from the battery 80 at the control office. These relays are oppositely connected, so that relay PW responds only to positive current in line Y, and is therefore normally picked up, as shown, while relay NW responds only to negative current and therefore becomes energized only when the office relay PC is picked up to reverse the current in line W. These relays control auxiliary relays PWP and NWP, and govern code transmission through the repeater station from left to right. Transmission from right to left is governed by a line relay RE which is of the stick polar type, like relay OR in Fig. 1, and which is connected to the line wires Y and Z of line E through a transformer 4E in a corresponding manner.

Assuming the apparatus of Fig. 3 to be in its normal condition, as shown, with positive polarity supplied to relay PW, its left-hand contact 60 is closed, completing a circuit from the positive terminal of the repeater station line battery 80E through the primary of transformer 4E, left-hand contact 60 of relay PW, back contact 61 of relay NWP, and the upper coils of a filter 12 to line wire Y of line E, and from the negative terminal of battery 80E a connection is completed over back contact 62 of relay NWP and the lower coils of filter 12 to line wire Z of line E. It will be evident therefore that since relay PW is responsive to periodic interruptions of the current in line W constituting a control code, its contact 60 will repeat the code into line E in the desired manner. It is desirable however that relay RE should be non-responsive to the operation of contact 60, and the manner in which this is accomplished will now be explained. Each time relay PW reverses a local circuit is completed from the positive terminal of battery 80E through transformer 4E, the right-hand contact 60 of relay PW, impedance 63, relay PWP to the negative terminal of battery 80E, impedance 63 being of such a value that the variations in the current supplied to transformer 4E are relatively slight. Relay PWP picks up upon the first reversal of relay PW and remains picked up for the duration of the code, being a slow pick-up slow release relay like the office relay PCP. For the duration of the control code, therefore, a circuit is closed from terminal B, back contact 64 of relay NWP, front contact 65 of relay PWP, through the lower winding of relay RE and resistor 66 to terminal C, to hold relay RE normal for the duration of the control code, as required.

Assuming now that the apparatus of Fig. 3 is in its normal condition as shown, and a station at the right shunts the line E to initiate an indication code. The consequent increase in the current from battery 80E will cause transformer 4E to deliver an impulse to relay RE in such a direction as to cause it to close its contact 67, thereby shunting resistors 8 and 9 and effecting a corresponding increase in the current in line W without releasing relays PW and NW. As hereinbefore explained, the result at the office is to pick up relay PC, reversing the polarity delivered to line W at the repeater station, so that relay PW will close its right-hand contact 69, and relay NW its left-hand contact 68, which contacts will then remain closed until the line polarity is restored to normal at the end of the code. Relay NW at contact 68 completes the circuit for relay NWP which picks up, its pole changer contacts 61 and 62 reversing the polarity supplied to line E, relay RE being maintained reversed during the operation of contacts 61 and 62 by current supplied for a brief period to its local winding from terminal B, front contact 64 of relay NWP, back contact 70 of relay PWP, relay RE, resistor 71 to terminal C.

Relay RE, being similar to relay OR as described in connection with Fig. 1, will now respond in a similar manner to the current variations in line E produced by the repeated operation of the transmitter relay T at the sending station, repeating these variations into line W by the operation of its contact 67 in the desired manner.

In the event the transmitting station is at the left of the repeater station of Fig. 3, the shunt periodically applied to the line by the station transmitter relay T to transmit its code will be applied to line W, and since the line polarity is reversed on the first step, relay NW, will be operated periodically while relay PW will remain released for the duration of the code. Each time line W is shunted, relay NW releases, opening the circuit for relay NWP which also releases and in this case disconnects battery 80E from line E because the circuit over back contact 61 of relay NWP is now open at contact 60. It follows that the code repeated into line E comprises periodic interruptions and is similar in character to that received over line W, and consequently it is effective for a similar purpose, namely, to lock out the more remote from the office of two or more stations which initiate codes at the same time, as hereinbefore described.

In the event a selector code of impulses of alternately opposite polarity is received at the repeater station over line W, it will be apparent that relay PW will repeat each positive impulse and relay NWP each negative impulse, to line E. It will be seen therefore, that the repeater of Fig. 3 functions in the required manner under each different condition of operation of the system of Fig. 1 or 2.

A characteristic of the novel mode of transmitting codes from the field stations by shunting the line wires, which is made manifest by its effect upon the repeater apparatus as just described, is that the indication codes are transmitted in two directions at the same time for two different purposes. Thus a code of current variations is transmitted from the sending station toward the office for indication purposes, and a code of impulses spaced by intervals of no current is transmitted in the opposite direction to lock out any station located in that direction which may happen to initiate a code at the same time. These effects may be separated more fully by employing non-interfering currents of different character for the two directions. For example, the lockout codes may be produced by shunting the office battery as in Fig. 1, and the indication codes may be produced by shunting the current from a non-interfering source connected across the line at the opposite end, as illustrated in Figs. 4 and 5. With this arrangement the source of current for the code is always back of the transmitter, which, as is well-known, is advantageous from the line transmission standpoint, as it permits a much higher degree of attenuation of the line currents to be tolerated and permits the use of simple one way repeaters, and is therefore adapted to long distance transmission purposes.

Referring now to Fig. 4, a C. T. C. system which functions in a manner generally similar to that of Fig. 1 is shown, comprising an office and one of a plurality of similar field stations each including code transmitting and receiving apparatus bridged across the line wires Y and Z. A source of alternating current indicated by the supply terminals BX1 and CX1 is connected through a transformer 75 across the line wires at a point adjacent to or at the right of the last station connection.

It may be assumed that the line wires of Fig. 4 are arranged as in Fig. 1, or otherwise, for joint communication purposes, and accordingly a relatively high frequency of alternating current is employed to avoid telephone interference, but it will be understood that under other circumstances sixty cycle current or the like may be used. As shown, therefore, the terminals BX1 and CX1 represent a source of alternating current of a frequency $f1$ above the voice frequency range which continuously supplies current to the line wires Y and Z through transformer 75 and a coil 78 and condensers C1 tuned to the frequency $f1$. This apparatus may be located at the main office at which the line wires Y and Z terminate, for convenience in maintenance, even though this may be at a considerable distance beyond the last C. T. C. station. The alternating current received at the C. T. C. office over line wires Y and Z energizes a circuit tuned to the frequency $f1$ comprising the coil 81 and condensers C1 bridged across line wires Y and Z, the resonant potential across coil 81 being amplified in a conventional manner by the amplifier A if required. The output of amplifier A, as shown, passes through transformer 83 and rectifier 84 to energize the office line relay OR.

Relays OR and R, in Fig. 4, are of the biased polar type as used at the office in Fig. 2 and at the stations in Fig. 1. The battery line circuit of Fig. 4 is similar to that of Fig. 1 except for the omission of the relay transformer 4, that is, it extends from battery 80 over back contact $b$ of relay OT, the pole changer contacts 14 and 15 of relay PC, back contacts 13 and 17 of relay 86 through the low pass filter 12 to line wires Y and Z, and thence in multiple through the circuit at each station including the station low pass filter 12, the pole changer contacts 29 and 30 of relay M and the winding of relay R.

Relays OR and R in Fig. 4 are therefore normally energized, as shown, and control their respective coding units in the usual manner as described in Patent No. 2,229,249. In Fig. 4 a control code can be initiated only when relay OR is steadily energized. Since this relay is energized by a source at the distant end of the line, it follows that a control code cannot be delivered to an open line, as in Fig. 1, nor to a short circuited line as when a series line circuit is used as in the patent, but only to a line that is free and available throughout its entire length, and that either a cross or an open circuit in the line at any point is immediately made manifest at the office by the release of the line relay OR, so that the proper action may be promptly taken. When relay OT operates its contact $b$ to deliver a control code, relay OR is operated in unison with the station relays R by the contact 85 of relay OT just as if relay OR were in series with the battery line as in the patent. The transmission of control codes therefore is effected in the usual manner.

At each field station in Fig. 4, in addition to the code frequency bridge across the line including the low pass filter 12 and contacts b of relays E and T, a high frequency bridge is also provided which extends in Fig. 4, from line Z through condensers C1 and a coil 78 tuned to the frequency f1 and over contacts 90 and 91 of relays E and T to line Y. A second high frequency bridge effective at the beginning of an indication code and corresponding to that provided over contacts 30 and 31, as hereinbefore described, is provided over contacts 92 and 93 of relays M and LBP. The indication codes are initiated by shunting the line at the station over contacts 92 and 93, to thereby reverse the battery line polarity in response to the consequent release of relay OR, and the transmission is effected in a manner analogous to that of the system of Fig. 1 as already described. It will be seen therefore, that when relay T is operated to transmit an indication code, its contact 91 is effective to transmit an alternating current code in the direction from right to left, to which the office line relay OR responds, while at the same time, its contact b transmits a battery code in the opposite direction which as heretofore not only operates relay R at the transmitting station to govern the transmission but is also effective to lock out any station more remote from the office which initiates an indication code at the same time.

It is also to be noted that the disagreement between the positions of the relays T at two stations which locks out the station more remote from the office does not interfere with the alternating current code element then being transmitted to the office by the nearer station.

In this connection, it has already been explained that in respect to the odd-numbered code steps, a long step takes precedence over a short step. Thus if relay T at the transmitting station nearer the office remains picked up to maintain its shunt for a relatively long period, relay OR will be released for a corresponding long period irrespective of the release of relays T and M to remove the shunt at the more remote station. Furthermore, in respect to the even-numbered code steps, a short step takes precedence over a long step. Therefore if a relay T picks up to shunt the line after a relatively short interval, relay OR will release irrespective of whether or not the line is shunted at the same time by relay T at any station more remote from the office.

It is also obvious that the operation of the system of Fig. 4 is wholly compatible with that of the selector system. When the selector system relay 86 picks up, it disconnects battery 80 from the line at back contacts 13 and 17 and opens the circuit for relay OR at contact 88, therefore relay OR is held released and relays R respond only to the positive impulses of the selector code, but without operating the selector relay S at any station, while the selectors are of too high reactance to respond to the alternating current codes.

The apparatus may be further modified in accordance with our invention to employ alternating current transmission in both directions. One manner in which this may be accomplished is shown in Fig. 5 which illustrates a modification of our invention which is an improvement over that of the Baugman Patent No. 2,224,374, hereinbefore referred to, in that in our system there is no C. T. C. apparatus whatever in series with the line wires, this being advantageous for reasons already pointed out. Fig. 5 differs from Fig. 4 principally in that the office pole changer relay PC has been replaced by a frequency changer relay FC, and in place of battery 80, two sources of alternating current of frequencies f2 and f3, respectively, are provided at the office, of which only the terminals are shown, these being designated BX2 and CX2, for the source of frequency f2, and BX3 and CX3, for the source of frequency f3. Current from frequency f1 is supplied to the remote end of the line from a source having the terminals BX1 and CX1 in the same manner as in Fig. 4, and each station line relay R in Fig. 5 is arranged to respond normally to current of frequency f2 only, but responds to current of frequency f3 only, in the event the associated relay M is picked up. In other words, alternating current of frequencies f2 and f3 in the line circuit of Fig. 5 takes the place of direct current of normal and reverse polarity, respectively, in the line circuit of Fig. 4.

Referring to Fig. 5, a local circuit is normally closed at the office extending from one terminal BX2 of the source of frequency f2 over back contacts b and 94 of relays OT and FC, condenser C2, the primary winding of a hybrid transformer 100, back contact 95 of relay FC to the other terminal CX2 of said source. The output of the hybrid transformer 100 is delivered by its secondary windings in one direction through condensers 98 to the line wires Y and Z, and in the other direction to a balancing network 99.

Current received at the office from the source of frequency f1, which is connected across line wires Y and Z at the remote end of the line as already explained, passes through condensers 98 and the upper secondary windings of transformer 100 and thence through parallel resonant circuit elements designated f2 and f3 (to indicate that they are for blocking the passage of currents of the corresponding frequencies) and thence as in Fig. 4, through a coil 81 and condenser C1 tuned to the frequency f1, amplifier A, transformer 83 and rectifier 84 over back contact 85 of relay OT to relay OR.

At each field station the line relay R is associated with the line by means of circuits which are generally similar to those provided for relay OR, but which differ by including a coil 81 and condenser C2 tuned to series resonance to render relay R normally responsive to current of frequency f2 only, and by including parallel resonant elements to render relay R non-responsive to current of frequency f1, as shown. In Fig. 5, therefore, each station line relay is normally energized by current supplied from the source of frequency f2 at the office, while the office line relay is normally energized by current supplied from the source of frequency f1 at the remote end of the line.

In the system of Fig. 5, relay OT is arranged to interrupt the current of frequency f2 at its contact b to control the relays R, and to interrupt the local circuit for relay OR at its contact 85, to thereby effect the transmission of control codes to the stations in an obvious manner, relays OR and R operating in unison as in the other forms of our invention.

With the apparatus of Fig. 5 in its normal condition, as shown, if relay M at a station picks up to initiate an indication code, the currents of both frequencies in line wires Y and Z are shunted, first over contacts 30 and 31 of relays M and LBP, and then over contacts b of relays E and T, as in the other forms of our invention already described, thereby releasing relay R at the transmitting station and at each station more remote from the office, and also releasing the office line relay OR. Relay M at the transmitting station furthermore at its contact 101 connects a condenser C3 in parallel with condenser C2 to change the tuning of the series resonant circuit governing relay R, so that upon removal of the shunt, relay R will be responsive only to current of frequency $f3$. Relay OR upon releasing effects the energization of relay FC, over a circuit extending from terminal B, contact 24 of relay OR, wire 18, contact d of relay OLBP, contact 59 of relay OM, relay FC to terminal C, and relay FC picks up completing its stick circuit at contact 103, and at its front contacts 94 and 95 connects terminals BX3 and CX3 of the source of frequency $f3$ to the primary of transformer 100, disconnecting the terminals BX2 and CX2, and at the same time closes contact 102 to connect a condenser C3 in parallel with condenser C2 at the office to change the tuning of the primary of the transformer 100 to render it responsive to frequency $f3$. The change in frequency of the current delivered to the line at the office effects the release of each line relay R which is energized when relay FC picks up, and all the relays R will remain released for the duration of the code except the one at the transmitting station, as heretofore.

It will be seen, therefore, that in Fig. 5 the shunting of the line wires by relay T is effective to transmit an indication code of periodically interrupted alternating current of frequency $f1$ from right to left to govern relay OR at the office, and to transmit a similar code of frequency $f3$ from left to right for governing relay R at the transmitting station and for locking out any station more remote from the office which may happen to initiate an indication code at the same time, while the absence of current of frequency $f2$ in the line insures that no station at the left of the transmitting station which is relatively so near the office that the shunting of the line at the transmitting station is ineffective, will initiate a code, and it follows therefore that the coding apparatus when controlled by the apparatus of Fig. 5 will function in the same manner as when controlled by that of Fig. 1, 2 or 4.

Since in both Figs. 4 and 5 the currents employed for transmission in the two directions are of dissimilar character, the transmission distance may be extended by the use of ordinary one-way repeaters in place of the repeater of Fig. 3 provided for the system of Figs. 1 and 2, and it follows therefore that not only may a wide variety of existing line facilities be made use of to provide the necessary transmission channels between the control office and the C. T. C. field stations, but the office may be located at any required distance without impairing the quality of the code transmission.

This may be readily shown by considering the initiation of indication codes as hereinbefore described. In the system of Patent No. 2,229,249 as used commercially, the length of the first step of an indication code although nominally a short step is considerably longer than the other short steps because of the additional relay operations occurring on that step, and in practice, relay T when first energized remains picked up for about 0.2 second. If the apparatus of Fig. 5, for example, is used with that system on a long line including repeaters, it will be apparent that when relay T first picks up, an impulse representing the effect of shunting the current of frequency $f1$ at the transmitting station is propagated along the line through the repeaters to the office, to operate relays OR and FC successively, and then an impulse of current of frequency $F^3$ is propagated from the office back to the station to render current of that frequency available to pick up relay R upon the release of relay T. Obviously the length of the first step is not affected unless it is less than the time required for these impulses to travel twice the length of the line as described, which time, under any condition likely to be encountered in practice, is less than 0.2 second. Furthermore, the latter value, being arbitrary, may readily be increased to match the line conditions if required. Since except for the first step of an indication code as pointed out above, the system employs "one way" transmission with the source of the line signals back of the transmitter, the distortion of the codes due to long line conditions is of no practical consequence particularly in view of the relatively low frequency of the code impulses.

It is also to be noted that the C. T. C. apparatus of Fig. 5, since it is connected to the line wires through condensers of relatively small capacity, may employ line circuits which are quite different from those of Fig. 1, such for example, as an alternating current power transmission line.

Such a transmission line is almost always available throughout the length of territory comprising a C. T. C. installation. Usually the track switches, signals and other apparatus involved are energized locally by storage batteries maintained energized by the trickle-charge method, by energy supplied from an alternating current source over a transmission line comprising a pair of added line wires on the pole line carrying the communication circuits, the voltage in the power line being limited by practical considerations to the maximum value permissible in such circuits, that is, to less than 500 volts.

The system of Fig. 5 may be superimposed on such a line, as is self evident, but the system of Fig. 1 or 2 may also be used by the provision of suitable arrangements for preventing interference, as shown in Figs. 6 and 7.

Referring to Fig. 6, the reference characters V1 and V2 designate the line wires of a transmission line of the type referred to, which is normally energized through a line transformer 105 from the terminals BX and CX of a suitable alternating current power source, and supplies alternating current through a transformer 107 to the supply terminals "a. c." of suitable battery charging apparatus at each station. The reference character V3 designates a ground wire on the pole line or an earth return rendered available by a connection to ground at each location.

The reference characters Y1, Z1 and Y2, Z2 designate the terminals of the C. T. C. office and station apparatus, respectively, corresponding to those which in Figs. 1 and 2 are connected to the line wires Y and Z, and it is to be understood that these terminals extend to apparatus within the rectangles, not shown, but similar to the correspondingly identified apparatus of Fig. 1 or 2. In Fig. 6, in lieu of the low pass filter 12, a parallel resonant circuit 106 is interposed in each connection from terminal Y to the line, this being arranged to block the flow of power current through the C. T. C. apparatus in the event of a failure or unbalance of the power line. The C. T. C. battery energized line circuit extends from terminal Y1 at the office through the resonant circuit 106 to the mid point of the secondary of transformer 105, thence over line wires V1 and V2 in multiple, and from terminal Z1 at the office to earth or to the ground wire V3. The apparatus at each station is bridged across this line circuit as in Fig. 1, by a connection from terminal Y2 through the station resonant circuit 106 to the mid point of the primary of the station transformer 107 and thence to line wires V1 and V2, and from terminal Z2 to earth or to the ground wire V3.

It will be readily apparent that the alternating current power does not reach the C. T. C. apparatus in the arrangement shown, and that control codes transmitted by periodically interrupting the battery current, and likewise indication codes transmitted by periodically grounding the mid point of transformer 107 are without effect upon the power system.

In Fig. 7 a different arrangement is shown, in which no ground connection is required, and which may also be used when the mid point or neutral of the transmission system is permanently grounded. In Fig. 7 the C. T. C. line terminals Y1, Z1 at the office and Y2, Z2 at each station are bridged across the line wires V1 and V2, and the power current is excluded from the C. T. C. apparatus by the provision of parallel resonant circuits 106 as in Fig. 6, and by additional series resonant circuits 108, bridged across the C. T. C. line circuit, as shown. A condenser 109 at each field station prevents the flow of the C. T. C. battery current through the primary of the station transformer 107, each condenser 109 being tuned by a coil 110 to present a low impedance to the power current, an arrangement rendered readily feasible because of the relatively small power demand at each station. At the office, the battery current is excluded from transformer 105 by a condenser 111 which preferably has a capacity equal to that of all the condensers 109, condenser 111 being tuned by a coil 112 of correspondingly low inductance.

It will be apparent therefore that in Fig. 7 the C. T. C. system and the power transmission system are mutually non-interfering.

In each of the views so far described, the control office is located near one end of the line, so that all of the stations are in the same direction from the office, as required by the station lockout circuits as described in connection with Fig. 1. It is however often desirable to locate the office at an intermediate point, and to employ the same pair of line wires for communication between the office and the stations located on opposite sides of the office, as illustrated in Figs. 8 and 9. This requires a modification of the lockout circuits so as to permit the code calls to be assigned, at least in part, to the various stations independently of their relative location. Such an arrangement is also to be preferred, even though all the stations are in the same direction from the office, in the event that the arrangement of the trackway apparatus to be controlled is such that several storage units are required at the same location. Under these circumstances, it is preferable to control all the storage units at a location by a single coding unit as described in Patent No. 2,229,249. When this is done it is sometimes inconvenient to assign the code calls in the order hereinbefore mentioned. As explained in the patent, each code call comprises a combination of three long and four short steps constituting the second to the eighth steps, inclusive, of the code, and each is designated by a combination of three digits identifying the numbers of the long steps. There are 35 such combinations, and the station apparatus is so arranged that the first two digits of the code call select a particular coding unit and the last digit selects a storage unit associated therewith. If the 35 code calls are arranged in groups, one for each coding unit, it will be seen that there is but one group, namely, the group 234 to 238, inclusive, by which five storage units can be controlled by the same coding unit, and but two other groups, 245 to 248 and 345 to 348, respectively, available for controlling four storage units by the same coding unit. If it is necessary to assign any of these code calls to the station nearest the office, a number of more superior code calls become unavailable, as will readily be apparent.

In the modification of our invention shown in Figs. 8 and 9, the code calls may be assigned without regard to the station location insofar as the even-numbered digits are concerned. It will be remembered that the line contact b of the station transmitter relay T is open during the transmission of even-numbered steps by relay T, and is closed to transmit the odd-numbered steps. Consequently, in Fig. 1, the shunting of the line by relay T at any station to produce a long odd-numbered step will remain effective at any station more remote from the office in the same direction, for a corresponding length of time, this being true of Figs. 8 and 9 as well as of Fig. 1. It follows that in respect to the odd-numbered digits the order of assignment with reference to the relative location is the same as that hereinbefore described. Furthermore, the relative order of code superiority is the same, a short even-numbered step taking priority over a long one, and a long odd-numbered step taking priority over a short one.

Referring now to Fig. 8, this view shows a modification of the system of Fig. 1 in which the office coding unit includes an additional transmitter relay TA controlled by the line relay OR over contacts of the counting relays O1, O2, etc. For convenience the circuits of the counting relays are reproduced in Fig. 8, in part, from Fig. 1 of Patent No. 2,229,249. The circuit for relay TA includes a front contact 111 of relay PCP, so that relay TA remains deenergized except during the transmission of indication codes, the transmission of control codes by the office apparatus of Fig. 8 being similar to that of the corresponding apparatus of Fig. 1 as already described and the operation of the station transmitters is the same, except as modified by the action of the office relay TA when two or more stations initiate codes at the same time.

Assuming but one station to be transmitting, the operation of relay TA is as follows: At the beginning of the third step of the indication code, when relay T picks up and shunts the line, relay OR operates contact 24 to the left, closing the pick-up circuit for relay O3 and also closing a branch of that circuit from terminal B over contact 24, wire 18, contact e of relay OLBP, back contact a of relay O1, front contacts b and 113 of relay O2, back contact 112 of relay CR, front contact 111 of relay PCP, relay TA to terminal C. Relay TA therefore picks up in unison with relay O3, but relay O3 upon picking up opens the stick circuit for relay O2 (not shown but similar to that for relay O3), releasing relay O2 to open the circuit just traced to release relay TA. When relay TA picks up, its contacts 114 and 115 shunt the line circuit, and its contact 116 closes to render transformer 4 ineffective to change the position of relay OR during the operation of relay TA.

It will be evident therefore that relay TA shunts the line at the office during the time it is shunted by relay T at the transmitting station with the same effect at an intermediate station, or at stations such as the ones designated 234 and 245 shown located in the opposite direction from the office, as that which is produced at those stations which are connected to the portion of the line beyond the transmitting station and which have their line relays shunted by relay T at the transmitting station.

Assuming now that a station for which the code call includes a long second step such as station 234 initiates a code at the same time as another station such as station 357 for which the code call includes a short second step, the two stations will remain in step until relay R at station 234 is released by the shunting of the line at the office by relay TA, to begin the third step. This will occur, due to the control of relay TA by station 357 at a time corresponding to the end of a short second step; but relay T at station 234 at this time is still released because the code call for that station includes a long second step. The lockout circuit including back contact 43 of relay T at station 234 will therefore be closed upon the release of the associated relay R for a sufficient time to pick up relay E to lock out station 234, as required.

Relay TA may be operated in a similar manner at the beginning of the fifth and succeeding odd-numbered steps, by circuits similar to the one described such as the one including contact 117 of relay O4, and its operation may be discontinued at the end of the station selecting portion of the code if desired by including a back contact 112 or relay CR in the circuit, as shown.

Assuming now that a third station located in the same direction but beyond station 234, such as the one indicated in Fig. 8, as having the code call 245 also initiated its code at the same time as the two stations just described, it will be locked out in unison with station 234 and in the same manner, as is readily apparent. If however the group of stations which initiate codes at the same time includes these two stations 234 and 245 but includes none for which the second step of the code call is short, the two stations will complete the second step and start the third step in unison, but station 245 having a short third step in its code call will begin the fourth step first, releasing its relay T to remove the line shunt at that station, but without picking up the associated line relay R or operating relay OR, because the line remains shunted by relay T at station 234 nearer the office, for the time required to produce a long third step. The lockout circuit at station 245 will therefore be closed at contact 43 upon the release of relay T, for a sufficient time to pick up relay E to lock out station 245, as required.

Fig. 9 illustrates another method for accomplishing the results just described, in accordance with our invention. In this view the office coding unit is similar to that of Fig. 1 except that the stick circuit for relay PC is omitted and this relay is energized by a direct connection over back contact 59, to wire 18, so that relay PS is picked up by and repeats the operation of relay OR on each odd-numbered step of an indication code. It follows that the line impulses of each indication code are of alternately opposite polarity, each increase in line current initiated by a station transmitter causing a reversal of polarity, and each decrease initiated by a station causing the restoration of the line polarity to normal. Relay PCP also operates on each step to prevent additional operations of relay OR due to these reversals of polarity. In the station apparatus of Fig. 9, the pole changer contacts interposed between relay R and the line in Fig. 1 are omitted, and since relays R are responsive to current of one polarity only, their operation is the same as if the line were opened at the office during each odd-numbered step, as in the line circuit of Patent No. 2,229,249. In addition contacts of the even-numbered counting relays are included in the lockout circuit controlling relay E in Fig. 9, to compensate for the time of operation of relay PC so that the operation will be similar to that of the corresponding relay E of Fig. 1, and the contacts 118 and 119 of relays M and T are interposed in the circuits leading to terminals 17a and 18a of the coding unit in place of the contact 40 of relay 16 shown in Fig. 1.

The transmission of control codes by the apparatus of Fig. 9 is identical with that of Fig. 1 as hereinbefore described but the transmission of indication codes is somewhat different.

Assuming but one station to be transmitting when relay T picks up to initiate the code and shunts the line circuit, relay PC at the office picks up to reverse the line polarity, as heretofore, but in this case relay R at the transmitting station as well as at other stations is held released due to the reversal of line polarity, and so does not pick up immediately upon the removal of the line shunt by the opening of front contact b of relay T to begin the second step, being held released by current of reverse polarity until relay OR responds by moving its contact 24 to the right to deenergize relay PC and the latter relay releases to restore the line polarity to normal. The time lag due to these additional operations is nullified in its effect upon the station coding unit by interposing contacts 118 and 119 in the circuits; thus, when the code is initiated, relay T picks up and relay R immediately releases, so that wire 18a is energized from terminal B over right hand contact 58 of relay R and front contacts 118 and 119 of relays M and T. When relay T releases to begin the second step, wire 18a is deenergized and wire 17a energized by the operation of contact 119 of relay T, while the opening of contact b of relay T operates relay OR to the right, releasing relay PC and restoring the polarity of the line to normal to pick up relay R, the arrangement being such that the delay in the operation of contact 58 of relay R to the left is without effect. Corresponding actions occur on each step of the indication code, as will be readily apparent.

Assume that in Fig. 9 station 234, for example, and another station for which the second step of the code call is short, initiate codes at the same time; the latter will begin its third step first, applying a shunt to the line to reverse the line polarity as above described, and thereby releasing relay R at station 234. Since relay T at station 234 is controlled to produce a long second step, the lockout circuit including its back contact 43 (which in this case, also includes front contact 120 of relay 2) will be closed upon the release of relay R for a sufficient length of time to pick up relay E to lock out station 234. Furthermore, if station 234 and another station such as 245, located in the same direction, but more remote from the office, initiate codes at the same time, they will complete the second step and start the third in unison, but the latter will begin the fourth step first, releasing its relay T to remove the line shunt at that station, but without picking up the associated line relay R or operating relay OR, because the line remains shunted by relay T at station 234 near the office, for the time required to produce a long third step. Consequently station 245 is locked out as already described in the case of Fig. 8.

Since the apparatus of Fig. 9 is similar to that of Fig. 1 except for the modifications described, it is believed that its operation will be readily understood without further description.

Although we have herein shown and described but three forms of our invention and several modifications thereof, it will be understood that various changes and modifications may be made therein within the scope of the appended claims without departing from the spirit and scope of our invention.

Having thus described our invention, what we claim is:

1. In a remote control system, an office and a plurality of stations connected by two line wires, a line relay at each station bridged across said line wires, a normally closed code signaling circuit including said line relays in multiple, said line wires and a source of current bridged across said line wires at said office, a code transmitter at each station effective when operated to connect the line wires together periodically at such station to deliver a multiple impulse code to the office over said line wires and to also control the associated line relay in accordance with such code, means governing the operation of each code transmitter controlled by the associated station line relay, and code responsive means at the office selectively controlled over said line wires in accordance with the operation of each code transmitter.

2. In a remote control system, an office and a station connected by two line wires, a normally closed signaling circuit including a source of current connected across said line wires at the office, said circuit also including said line wires and a line relay connected across said line wires at said station; a normally deenergized line relay at the office responsive to variations in the normal current in said signaling circuit, a code transmitter at said station operable to connect said line wires together periodically to short circuit the station line relay whereby said station line relay is operated and the current in said signaling circuit is varied to operate the office line relay, both in accordance with a code, a code receiver at the office governed by the office line relay and selectively responsive to said code, and means controlled by the station line relay for governing the operation of said code transmitter.

3. In a remote control system, a line circuit extending from a control office through a plurality of stations to a distant point comprising two line wires which are continuous from end to end to form a portion of a transmission circuit connecting said office and distant point and arranged for the control of apparatus responsive to alternating current, a current source for supplying current to which said apparatus presents a relatively high impedance connected to said line wires at the office, a line relay selectively responsive to current from the office source connected to said line wires at each station, a line relay at the office adapted to be controlled over said line wires in response to variations in the current from said office source but arranged to be non-responsive to current for operating said apparatus and also nonresponsive to the normal current delivered to said line wires from said source, a code transmitter at the office effective to periodically disconnect the office source from the line wires to operate the station line relays in accordance with different codes, and a code transmitter at each station effective to periodically connect the line wires together through an impedance which is relatively low with respect to the current from said source but high with respect to current for controlling the alternating current apparatus in said transmission circuit, to vary the line current to operate the office line relay in accordance with a code.

4. In a remote control system, an office and a plurality of stations connected by two line wires a relatively high impedance line relay bridged across said line wires at each station, a normally closed code signaling circuit including a source of current located at said office, said circuit also including said line wires and said line relays; a line relay at the office responsive to variations in the normal current in said signaling circuit, a code transmitter at each station effective when operated to connect the line wires together periodically at such station through a relatively low impedance to vary the current in said line circuit and to control the associated line relay in accordance with a code, a code receiver at the office governed by the office line relay and selectively responsive to said code, and means controlled by each station line relay for governing the operation of the associated code transmitter.

5. In a remote control system, an office and a plurality of stations connected by two line wires, a line relay included in a branch circuit bridged across the line wires at each station, a normally closed code signaling circuit including a source of current located at the office, said line wires and said line relays, a code transmitter at each station effective when operated to connect the line wires together periodically at such station through a relatively low impedance to shunt the associated line relay in accordance with a code and to deliver said code to said line wires, a code receiver at the office controlled over the line wires and selectively responsive to the codes produced by the periodic shunting of the line wires at a station, means for initiating the operation of each code transmitter effective only when the associated line relay is steadily energized, and means for continuing the operation of such transmitter to complete its code effective only so long as the code to which the associated line relay responds corresponds to that delivered by such transmitter.

6. In a remote control system, an office and a plurality of stations connected by two line wires, a line relay responsive to current of one polarity only bridged across said line wires at each station, a source of current of reversible polarity at the office normally supplying current to the line wires in such a direction as to maintain all said line relays energized, a line relay at the office normally responsive only to a substantial increase in the current delivered to the line wires from said source, code transmitting apparatus at each station effective when initiated to render the associated line relay responsive only to current of reverse polarity in the line wires and to momentarily connect the line wires together to increase the line current to effect an initial operation of the office line relay, means responsive to said initial operation for reversing the polarity of the line current, means controlled by the line relay responsive to current of reverse polarity for periodically connecting the line wires together to govern said office line relay in accordance with a code, means for restoring the line polarity to normal, and means for initiating the operation of each station transmitter effective only when the line wires are steadily energized by current of normal polarity.

7. In a remote control system, an office and a plurality of stations connected by two line wires, a normally closed line circuit including a source of current of reversible polarity bridged across the line wires at the office and a normally energized line relay responsive to current of one polarity only at each station, a line relay at the office controlled over said line circuit but normally responsive only to a substantial increase in the current in said line circuit, a code transmitter at each station effective when initiated to reverse the connections of the associated line relay to the line circuit and to momentarily close a shunt across the line wires thereby increasing the current in the portion thereof extending from such station to the office to effect an initial operation of the office line relay and reducing the current in the remaining portion of the line wires to release the line relays at stations more remote from the office, means for initiating each station transmitter effective only when the associated line relay is normally energized, means controlled by the office line relay in response to such initial operation to reverse the polarity of the line current, means controlled by the line relay which has its connections reversed for continuing the operation of the associated transmitter to complete its code effective only so long as the code to which such line relay responds corresponds to that delivered by the associated transmitter, and means for restoring the polarity of the line current to normal at the end of each such code.

8. In a remote control system, an office and a plurality of stations connected by two line wires normally supplied at the office with current of one character, a control relay effective when operated to discontinue the supply of said current of one character and to supply current of another character to said line wires at said office, a normally energized line relay normally responsive to current of said one character only connected across said line wires at each station, a line relay at the office adapted to be controlled over said line wires in response to current variations therein but non-responsive to current of said one or said another character, a code transmitter at each station effective when initiated to connect said line wires together momentarily to vary the current therein to effect an initial operation of the office line relay, relay means responsive to said initial operation to operate said control relay to thereby supply current of said another character only to the line wires, and means governed in accordance with the response of the line relay associated with the initiated transmitter to current of said another character for continuing its operation to periodically connect the line wires together to operate the office line relay in accordance with a code.

9. In a remote control system, an office and a plurality of stations connected by two line wires normally supplied at the office with current of one character, a control relay effective when operated to discontinue the supply of said current of one character and to supply current of another character to said line wires at said office, a normally energized line relay connected across said line wires at each station, a line relay at the office adapted to be controlled over said line wires from any station but non-responsive to the current of said one or said another character, a code transmitter at the office effective when initiated to control said office line relay and to periodically interrupt the supply of current to said line wires to control said station line relays in accordance with different codes, a code transmitter at each station, means for initiating each station transmitter effective only when the associated line relay is steadily energized by current of said one character, means controlled by each station transmitter when initiated to connect said line wires together momentarily to operate the office line relay, means responsive to such operation of the office line relay for operating said control relay to supply current of said another character only to the line wires, means governed by the line relay associated with the initiated transmitter for continuing its operation to periodically connect the line wires together to operate the office line relay in accordance with a code, but only if such relay becomes energized by current of said another character within a predetermined time interval after such transmitter is initiated.

10. In a remote control system, an office and a station connected by two line wires, a normally closed signaling circuit including said line wires and a source of current of reversible polarity at the office, a normally energized line relay at the station normally responsive only to current of normal polarity included in said circuit, a line relay at the office biased normally to its released position but adapted to be controlled over said signaling circuit from said station, a code transmitter effective when operated to connect said line wires together at the station to increase the current in said line wires for a brief period to operate the office line relay, said transmitter also operating to reverse the connections of the station line relay to render such relay responsive only to current of reverse polarity received after the termination of such period, means effective only when the station line relay is energized by current of normal polarity for initiating the operation of said code transmitter, means controlled by the office line relay in response to such initial operation to reverse the polarity of the line current, means at the station effective only if the station line relay becomes energized by current of reverse polarity within a predetermined time interval after the termination of said period for operating the associated transmitter repeatedly to transmit a multiple step code, a code receiver at the office selectively responsive to said code, and means for restoring the polarity of the line current and the connections of the station line relay to normal at the end of said code.

11. In a remote control system, an office and a station connected by two line wires, a source of direct current connected across said line wires at the office, a normally deenergized two position line relay of the stick polar type having contacts which close in response to its energization in a given direction and remain closed until it is energized in the opposite direction, a transformer at said office having its primary winding in series with said source and its secondary in series with the winding of said relay, means at the station for periodically varying the current delivered to the line wires from said source to cause said transformer to supply impulses of alternately opposite polarity to said relay, said impulses being time spaced in accordince with a code, and a code receiver controlled by the contacts of said line relay and selectively responsive to said code.

12. In a remote control system, a line relay of the stick polar type operable to reverse and normal positions by impulses of alternately opposite polarity, a line circuit including a source of direct current, a transformer interposed between the winding of said relay and said line circuit for supplying the relay with impulses of alternately opposite polarity when the current in said line circuit is periodically varied in accordance with a code of time spaced impulses, a code receiver controlled by said relay and selectively responsive to said code, and timing means effective to supply said relay with an impulse for restoring it to its normal position in the event said relay remains in its reversed position for a predetermined time interval which is longer than any time interval occurring in said code.

13. In a remote control system, a line circuit, means for supplying said line circuit with current variations, a normally deenergized two position line relay of the two position stick polar type arranged to be held in its last operated position when deenergized, a transformer interposed between said relay and said line circuit for supplying said relay with impulses of alternately opposite polarity corresponding to the rate of change of the current in said line circuit, and timing means effective to operate said relay locally to a particular position if said relay remains in its other position for more than a predetermined time interval.

14. In a remote control system, a line circuit, means for supplying said line circuit with current variations, a normally deenergized two position line relay of the two position stick polar type arranged to be held in its last operated position when deenergized, a transformer interposed between said relay and said line circuit for supplying said relay with impulses of alternately opposite polarity corresponding to the rate of change of the current in said line circuit, timing means controlled by the relay and initiated upon each operation of the relay to a reverse position, and means controlled by said timing means for supplying said relay with a current impulse restoring it to a normal position in the event said relay remains in said reverse position for more than a predetermined time interval.

15. In a remote control system, a line circuit, a normally deenergized line relay of the two position stick polar type arranged to be held in its last operated position when deenergized, means comprising a transformer for supplying said relay with codes of time spaced impulses of alternately opposite polarity from said line circuit, a code receiver controlled by said relay and selectively responsive to said codes but only if said relay is in a particular one of said positions when the first impulse of a code is received, timing means controlled by said relay, and means controlled by said timing means for automatically restoring the relay to said one position if it remains in its other position for more than a predetermined time interval.

16. In a remote control system, a line circuit, a normally deenergized line relay of the two position stick polar type arranged to be held in its last operated position when deenergized, means comprising a transformer for supplying said relay with codes of time spaced impulses of alternately opposite polarity from said line circuit, a code receiver controlled by said relay and selectively responsive to said codes but only if said relay is in a particular one of said positions when the first impulse of a code is received, and means effective to automatically restore the relay to said one position if it is operated to its other position by an impulse which is not followed by other impulses to constitute a code.

17. In a remote control system, an office and a plurality of stations connected by two line wires, a line relay responsive to current of a normal polarity only in said line wires at each station, a source of current of reversible polarity at the office normally supplying current to the line wires in such a direction as to maintain each station line relay energized, a line relay at the office responsive to variations in the current supplied to the line wires from said source, a pole changer relay controlled by the office line relay for reversing the polarity of the line current, local circuit means for energizing the office line relay momentarily each time said pole changer is operated, said local energization being effective to maintain it in its last operated position while the line current is varying due to a change in the line polarity by said pole changer, a code transmitter controlled by each station line relay for impressing current variations on said line circuit for governing said office line relay to control said pole changer, and means for initiating the operation of each station transmitter effective only when the associated line relay is steadily energized by current of normal polarity.

18. In a remote control system, in combination with a line circuit normally supplied with direct current, a two position line relay of the stick polar type inductively coupled to said line circuit and thereby rendered responsive to variations in said current, a pole changer controlled by the line relay for reversing the relative polarity of said current, and circuit means controlled by said pole changer for locally energizing said line relay momentarily each time said pole changer is operated, said energization being in such a direction as to maintain the line relay in its last operated position while the line current is varying due to a change in the line polarity by said pole changer.

GEORGE W. BAUGHMAN.
NORMAN F. AGNEW.